United States Patent [19]

Tanaka

[11] Patent Number: 5,381,761

[45] Date of Patent: Jan. 17, 1995

[54] FAN COUPLING FOR AN ENGINE OF A VEHICLE

[75] Inventor: Seiya Tanaka, Kariya, Japan

[73] Assignee: Aisin Seiki Kabushiki Kaisha, Kariya, Japan

[21] Appl. No.: 106,721

[22] Filed: Aug. 13, 1993

[30] Foreign Application Priority Data

Aug. 20, 1992 [JP] Japan .................................. 4-221262

[51] Int. Cl.⁶ .................................................. F07P 7/02
[52] U.S. Cl. .............................. 123/41.12; 192/58 B; 192/82 T
[58] Field of Search .............. 123/41.12; 192/58 B, 192/82 T

[56] References Cited

U.S. PATENT DOCUMENTS 4,667,791 5/1987 Martin et al. ............... 192/58 B

FOREIGN PATENT DOCUMENTS

| 43-14013 | 6/1943 | Japan . |
| 56-129620 | 3/1955 | Japan . |
| 61-79032 | 4/1986 | Japan . |

*Primary Examiner*—Noah P. Kamen
*Attorney, Agent, or Firm*—Oblon, Spivak, McClelland, Maier & Neustadt

[57] ABSTRACT

A fan coupling for an engine of a vehicle includes a housing for mounting a cooling fan which includes a storing chamber, a rotor disposed in the housing and including a torque transmitting portion at one side surface, a passage communicating the storing chamber with the torque transmitting portion, and a controlling valve for opening and closing the passage in proportion to the temperature of the cooling water for the engine.

20 Claims, 4 Drawing Sheets

FAN COUPLING FOR AN ENGINE OF A VEHICLE

BACKGROUND OF THE INVENTION

1. Field of the Invention

This invention relates to a fan coupling for an engine of a vehicle which controls the rotational speed of a cooling fan of a water-cooled engine according to the temperature of the air passed through the radiator and the temperature of the cooling water.

2. Description of the Related Art

A conventional fan coupling for an engine of a vehicle is disclosed in Japanese Patent Laid Open No. 61(1986)-79032. The fan coupling for an engine of a vehicle comprises a housing separated into an operating chamber and a storing chamber by a separating plate. A rotor which includes a first torque transmitting portion on one side thereof and a second torque transmitting portion on the other side thereof is disposed in the operating chamber. The separating plate includes a first passage which communicates the first torque transmitting portion with the storing chamber and the second passage which communicates the first torque transmitting portion with the second torque transmitting portion. Both the first passage and the second passage are opened and closed by a single valve member which is formed into a plate-shaped configuration.

The valve member is operated by the temperature of the air passed through an radiator of a water-cooled engine and the temperature of the cooling water. When the temperature of the air passed through the radiator is raised to a predetermined value after warming up of the engine, the valve member is rotated by a bimetal element disposed outside of the housing in order that only the first passage may be opened in proportion to the rotation angle of the bimetal element. Therefore the storing chamber is communicated with the first torque transmitting portion in the operating chamber. Because the rotational torque of an input member connected with the rotor is transmitted to the housing through the first torque transmitting portion, the cooling fan fixed to the outer periphery of the housing is rotated slowly.

Later when the temperature of the cooling water is raised to a predetermined value, the valve member is raised by the expansion of a thermowax which is heated by the cooling water. Therefore the second passage is also opened. Consequently the storing chamber is communicated with both the first torque transmission portion and the second torque transmitting portion. Because the rotational torque of the input member is transmitted to the housing through both the first torque transmitting portion and the second torque transmitting portion, the cooling fan is rotated rapidly.

However because the entire second passage of the conventional fan coupling for an engine of a vehicle is opened at one time by the expansion of the thermowax, the rotational speed of the cooling fan is increased rapidly and it is impossible to control the rotational speed of the cooling fan in proportion to the temperature of the cooling water.

Japanese Utility Model Laid Open No. 56(1981)129620 discloses a fan coupling for an engine of a vehicle which comprises a valve member. The valve member is supported on a rotor by a pair of guides and closes openings disposed on the rotor. The valve member is connected with a rod which is slidable by expansion or shrinkage of a thermowax. By expanding the thermowax the valve member opens the openings.

However the valve member of the fan coupling does not gradually open the openings. Therefore the rotational speed of the cooling fan disposed on the fan coupling is increased rapidly.

SUMMARY OF THE PRESENT INVENTION

It is an object of the present invention to provide an improved fan coupling for an engine of a vehicle which controls the rotational speed of a housing in proportion to the temperature of the cooling water.

It is another object of the present invention to provide an improved fan coupling for an engine of a vehicle, which coupling does not need a large housing.

It is a further object of the present invention to provide an improved fan coupling for an engine of a vehicle which reduces the noise of the cooling fan.

It is a further object of the present invention to provide an improved fan coupling for an engine of a vehicle which reduces parasitic losses of engine output due to the fan.

It is a further object of the present invention to provide an improved fan coupling for an engine of a vehicle which is available for any kind of engine.

It is a further object of the present invention to provide an improved fan coupling for an engine of a vehicle which is simple in structure and small in size.

It is a further object of the present invention to provide an improved fan coupling for an engine of a vehicle which is lower in cost.

To achieve the above mentioned objects, a fan coupling for an engine of a vehicle in accordance with this invention comprises a housing for mounting a cooling fan which includes a storing chamber, a rotor disposed in the housing and including a torque transmitting portion at one side surface, a passage communicating the storing chamber with the torque transmitting portion, and controlling means for opening and closing the passage in proportion to the temperature of the cooling water for an engine.

BRIEF DESCRIPTION OF THE DRAWINGS

The features and advantages of the fan coupling for an engine of a vehicle according to the present invention will be more clearly appreciated from the following description in conjunction with the accompanying drawings wherein.

DESCRIPTION OF THE PREFERRED EMBODIMENTS

Figure 1:
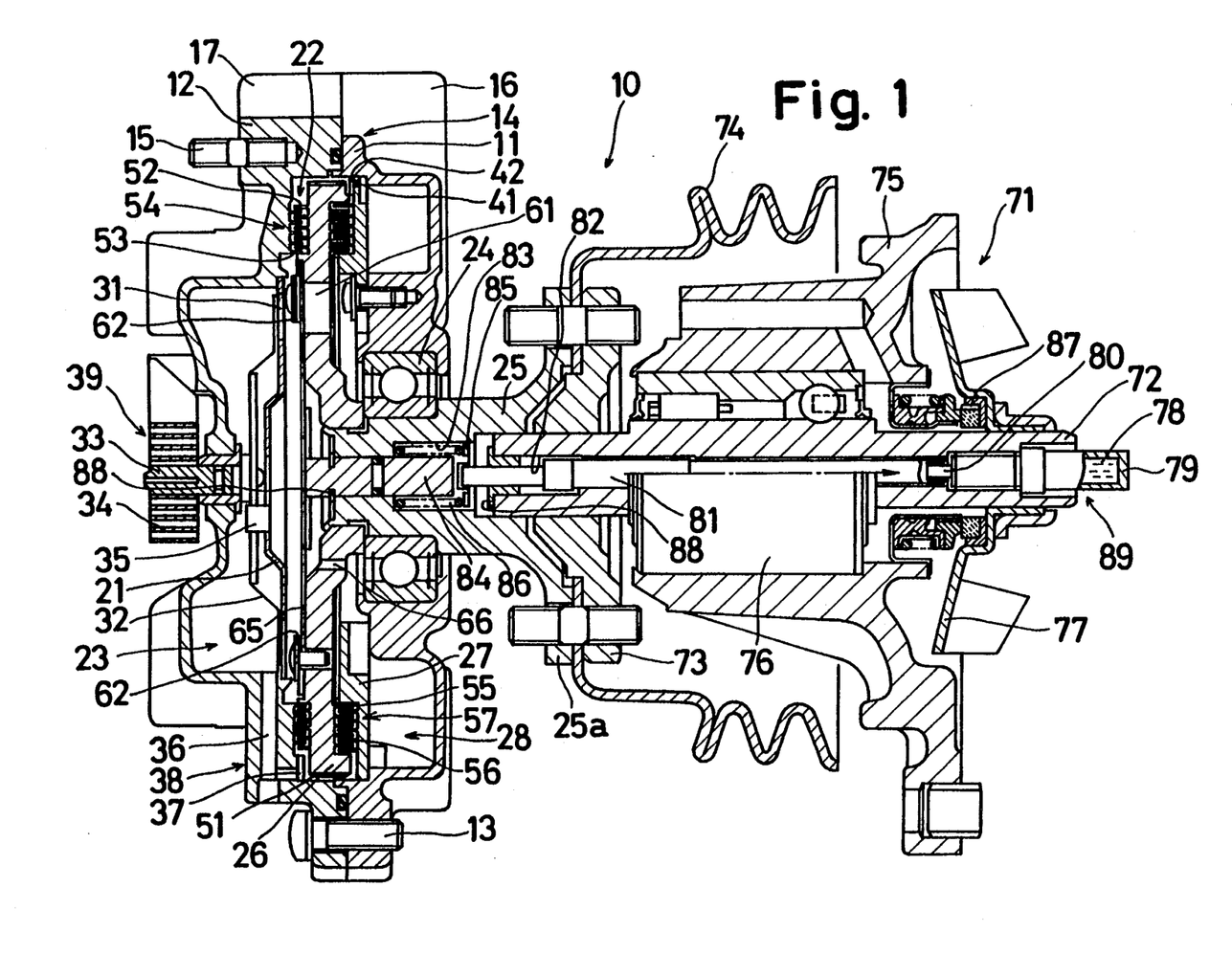
FIG. 1 is a sectional view of a fan coupling for an engine of a vehicle of the present invention.

In FIG. 1 a fan coupling for an engine of a vehicle 10 comprises a housing 14 formed with a case 11 and a cover 12 connected to each other by a plurality of bolts 13. A plurality of stud bolts 15 extend from housing 14 for mounting a cooling fan (not shown in the FIGURES) on the housing 14. The cooling fan faces a radiator (not shown in the FIGURES) of a water-cooled engine (not shown in the FIGURES). The cooling fan blows a quantity of air against the radiator in proportion to the rotational speed thereof. Each of reference numerals 16 and 17 indicates a radiating fin of the housing 14.

The housing 14 contains a viscous fluid therein. The housing 14 comprises an operating chamber 22, a first storing chamber 23 and a second storing chamber 28 separated from one another by a first separating plate 21 and a second separating plate 27. A shaft 25 is drivably disposed in the housing 14 through a bearing 24. The shaft 25 projects into the operating chamber 22 and a rotor 26 is fixed on the left end of the shaft 25 by riveting the rotor to the tip of the shaft 25.

The first separating plate 21 has a first passage 31 which communicates the operating chamber 22 and the first storing chamber 23. The first passage 31 is opened and closed by the rotational of a slide valve 32 which is formed in a thin plate shaped configuration. A rod 33 is fixed on a center portion of the slide valve 32 at one end thereof. A bimetal 34 element is disposed outside of the cover 12 and is connected with the other end of the rod 33 at an inner periphery end thereof. An outer periphery end of the bimetal 34 is fixed on the cover 12. The rotational angle of the slide valve 32 is delimited by a pin 35 which is disposed on the first separating plate 21. The first control means 39 for controlling the first passage 31 are thus formed by the slide valve 32, the rod 33 and the bimetal element 34.

A plurality of pump passages 36 which communicate the operating chamber 22 with the first storing chamber 23 are disposed in the cover 12. A pump projection 37 is disposed near each of the pump passages 36. Pumping means 38 are formed by each of the pump passages 36 and the pump projections 37. On the other hand, the second separating plate 27 comprises a circumferential plurality of pumping passages 41 which communicate the operating chamber 22 with the second storing chamber 28. A pumping projection 42 is disposed on the side of the operating chamber 22 near each of the pumping passages 41.

The rotor 26 includes a helical spline portion 51 at an outer periphery portion. The helical spline portion 51 pumps out the viscous fluid from the right side of the rotor 26 to the left side of the rotor 26 in FIG. 1. The rotor 26 further includes an annular spline portion 52 at the left side thereof as shown in FIG. 1. An annular spline portion 53 is disposed on the cover 12. A first torque transmitting portion 54 is formed by the annular spline portion 52 cooperating with the annular spline portion 53.

On the other hand, the rotor 26 includes an annular spline portion 55 at the right side thereof as shown in FIG. 1. An annular spline portion 56 is disposed on the second separating plate 27. A second torque transmitting portion 57 is formed by the annular spline portion 55 cooperating with the annular spline portion 56.

Figure 2:
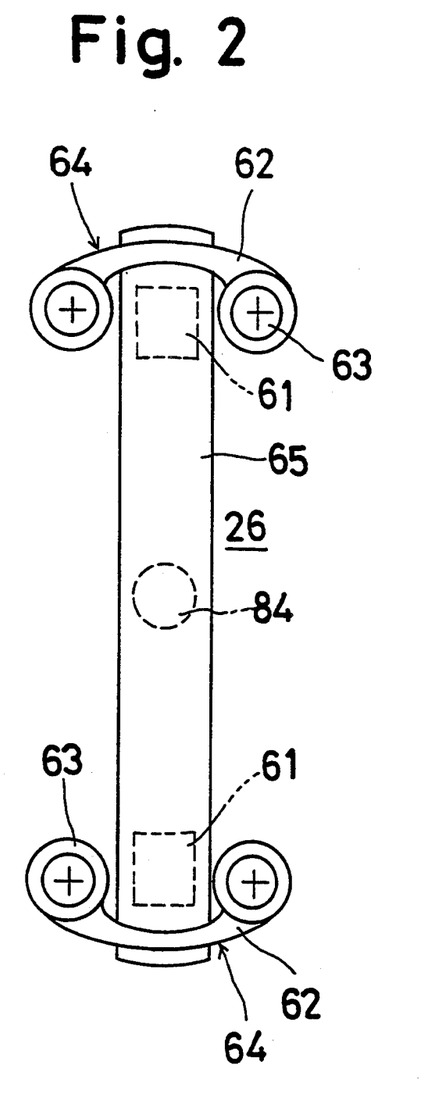
FIG. 2 is a plan view of a valve member of a fan coupling for an engine of a vehicle shown in FIG. 1 when the valve member closes the second passage.

The rotor 26 also comprises the second passage 61 which is located at a radial position almost equaling that of the first passage 31. FIG. 2 shows a pair of restraint or bridge members 62 which are fixed on one side surface of the rotor 26 by screws 63. A pair of openings 64 are defined on one side surface of the rotor 26 by the bridge members 62. A valve member 65 is formed by an elongate resilient plate and each of its ends is fitted into one of the openings 64. The valve member is thus held on the surface of the rotor 26 by the bridge members so as to close the second passage 61.

A hole 66 relieves the pressure of the viscous fluid.

The shaft 25 is disposed coaxially with a shaft 72 of a water pump 71. A pulley 74 is disposed between a seat portion 25a of the shaft 25 and a seat member 73 fitted to the shaft 72 so that the pulley 74 dives both shafts 25 and 72. The pulley 74 is driven by the engine through a crank pulley and a belt (neither is shown in the FIGURES). A housing member 75 is fixed on a cylinder block (not shown in FIGURES) of the engine. The shaft 72 is drivably supported in the housing member 75 through a bearing 76. An impeller 77 of water pump 71 is disposed on the right end of the shaft 72 and a casing 79 is fitted in the right end portion of the shaft 72.

The casing 79 is filled with thermowax 78 as the detecting means of the temperature of the cooling water. The thermowax 78 receives heat from the cooling water of the engine. The thermowax 78 expands at a high temperature and shrinks at a low temperature. The first rod 81 is slid in the right or left direction by expansion or shrinkage of the thermowax 78, via a piston 80. The first rod 81 is supported in a through hole 82 of the shaft 72 and the left end of the first rod 81 faces the second rod 84 which is supported in a through hole 83 of the shaft 25.

A retainer 85 is engaged with the right end of the second rod 84. A spring member 86 disposed between a stepped portion of the through hole 83 and the retainer 85 forces the second rod 84 toward the right direction. The left end of the second rod 84 is engaged with an approximate center portion of the valve member 65.

Reference numerals 87 and 88 respectively indicate a sealing member and stopper members for limiting the movement of the first and second rods.

A second controlling means 89 for controlling the second passage 61 is formed by the bridge members 62, the valve member 65, the thermowax 78, the first rod 81, the second rod 84 and the spring member 86. A shape memory effect alloy or a shape memory effect synthetic material may be used instead of the thermowax 78.

Operation of the fan coupling for an engine of a vehicle according to the present invention will be described hereinafter. When the engine is not driven, the viscous fluid collects at a lower portion of the housing 14. The capacity of the operating chamber 22 is small and the second storing chamber 28 is located at a radially outer portion of the first storing chamber 23. Therefore most of the viscous fluid collects in the second storing chamber 28. Less of the viscous fluid collects in the first storing chamber 23 than in the second storing chamber 28 and the least amount of the viscous fluid collects in the operating chamber 22.

When the engine starts to be driven, the pulley 74 receives the driving torque from the crank pulley through the belt. Therefore the shafts 25 and 72 are driven and the water pump 71 circulates cooling water around a cooling circuit (not shown in FIGURES) of the engine. At this time, because the temperature of the cooling water in the radiator is low, the temperature of the air which has passed through fins (not shown in FIGURES) of the radiator is also low. Because the bimetal element 34 remains at low temperature, the bimetal element 34 does not move. Therefore the slide valve 32 continues to close the first passage 31.

The rotor 26 is driven with the shaft 25, and the housing 14 and fan are also driven by the first torque transmitting portion 54 and the second torque transmitting portion 57 due to the viscous fluid in the operating chamber 22. The viscous fluid at the first torque transmitting portion 54 and the second torque transmitting portion 57 is then collected at an outer periphery portion in the operating chamber 22 due to centrifugal force. The rotational speed of the housing 14 is lower than that of the rotor 26 and there results a relative speed difference between the housing 14 and the rotor 26. Therefore the viscous fluid at the first torque transmitting portion 54 is pumped out to the first storing chamber 23 by the pumping means 38 and the viscous fluid at the second torque transmitting portion 57 is pumped out to the first storing chamber 23 by the helical spline portion 51 and the pumping means 38. Furthermore the viscous fluid in the second storing chamber 28 is pumped out to the first storing chamber 23 by the operation of the pumping passages 41 and the pumping projections 42, the helical spline portion 51 and the pumping means 38. As mentioned above, because the first passage 31 is closed by the slide valve 32, the viscous fluid steadily collects in the first storing chamber 23 instead of returning to the operating chamber 22. Therefore the housing 14 and fan are rotated at a very low speed relative to the rotational speed of the rotor 26 because of the low torque transmission at the first torque transmitting portion 54 and the second torque transmitting portion 57.

At this time because the temperature of the cooling water is also low, the volume of the thermowax 78 is small. Therefore the first rod 81 and the second rod 84 are forced by the spring member 86 toward the right direction shown in FIG. 1. And, as shown in FIG. 2, the valve member 65 continues to close the second passage 61. Consequently as soon as the engine starts to be driven, the rotational speed of the cooling fan is slightly increased by the viscous fluid in the operating chamber 22. The slight increase of the rotational speed in the cooling fan immediately disappears due to the operation of the pumping means 38. However since a little viscous fluid remains in the operating chamber 22, the cooling fan continues to be rotated with a rotational speed R1 shown in FIG. 6 because the pump means 38 can not pump out all the viscous fluid.

Figure 6:
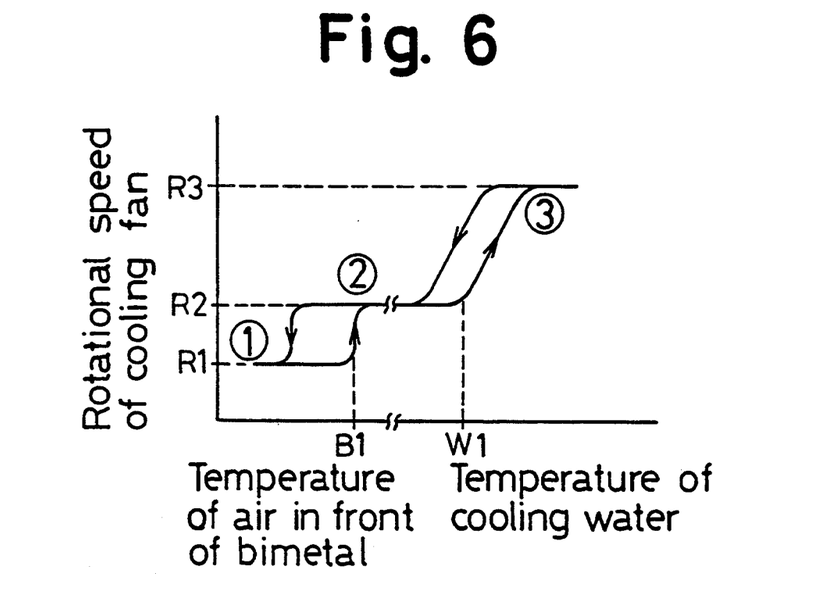
FIG. 6 is a diagram which shows the rotational speed of a cooling fan fixed on a fan coupling for an engine of a vehicle of the present invention.

As the engine is driven, the temperature of the cooling water and the air passing through the fins of the radiator are raised at B1 shown in FIG. 6. When the bimetal element 34 achieves the temperature B1, the bimetal element 34 operates the slide valve 32 so as to open the first passage 31. Therefore the viscous fluid in the first storing chamber 23 flows into the operating chamber 22 through the first passage 31. At this time the temperature of the cooling water is not high enough to expand the thermowax 78. Therefore the valve member 65 continues to close the second passage 61 as shown in FIG. 2 and 4.

Figure 4:
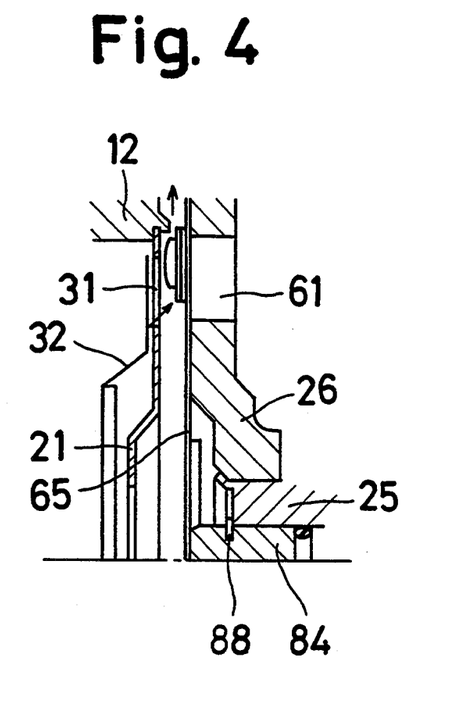
FIG. 4 is a sectional view of a closed condition of a valve member shown in FIG. 2.

The viscous fluid flows into the first torque transmitting portion 54 in the operating chamber 22 from the first passage 31 as shown in FIG. 4. Therefore the cooling fan with the housing 14 is rotated by the rotor 26 only through the torque transmitting portion 54 and the cooling fan continues to rotate with a middle speed R2 (R2>R1) shown in FIG. 6.

By the way the viscous fluid flowing into the first torque transmitting portion 54 collects at the outer periphery portion of the operating chamber 22 due to centrifugal force and is pumped out to the first storing chamber 23 by the pumping means 38. Therefore under this condition the viscous fluid circulates through a circuit which includes the first storing chamber 23, the first passage 31, the first torque transmitting portion 54, the pumping means 38 and back to the first storing chamber 23. In FIG. 6 the increase of the rotational speed of the cooling fan from R1 to R2 occurs instantly. However the increase in the rotational speed of the cooling fan from R1 to R2 can be performed in proportion to the temperature of the air by altering the shape of the opening of the first passage 31.

Figure 3:
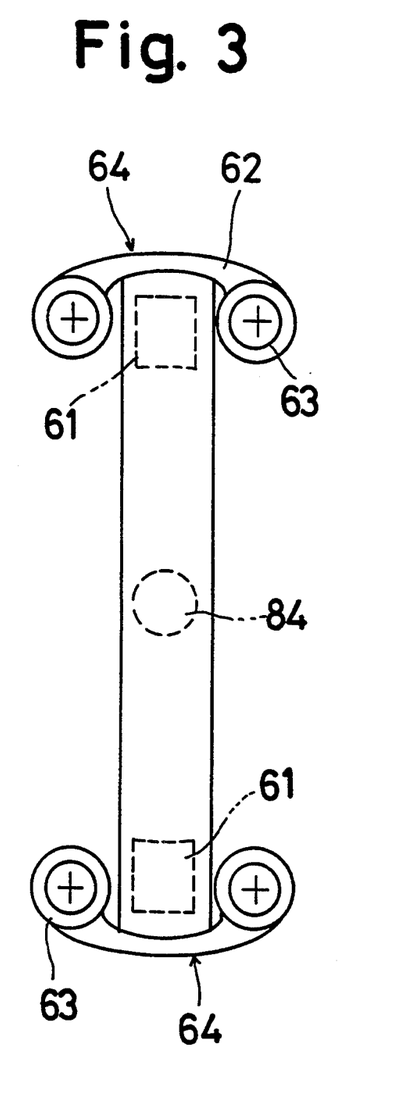
FIG. 3 is a plan view of a valve member of a fan coupling for an engine of a vehicle shown in FIG. 1 when the valve member opens the second passage.
Figure 5:
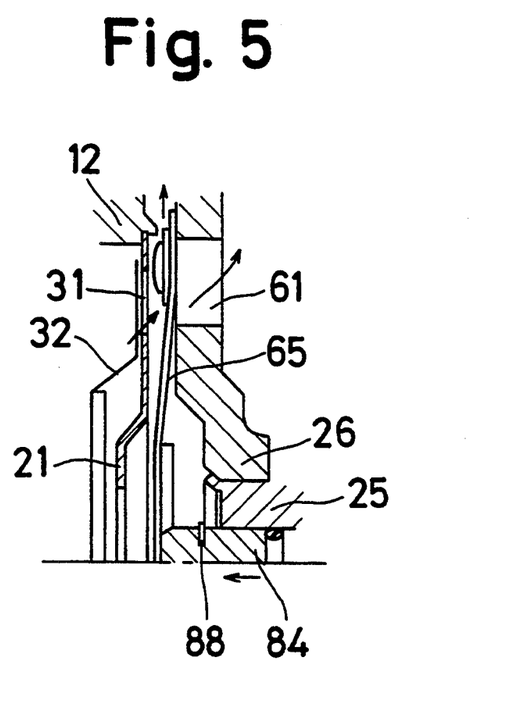
FIG. 5 is a sectional view of an opened condition of a valve member shown in FIG. 3.

As the engine continues to be driven, the temperature of the cooling water and the air passing through the fins of the radiator rises further. When the temperature of the cooling water reaches W1 shown in FIG. 6, the volume of the thermowax 78 starts to expand. The first rod 81 and the second rod 84 are forced toward the left direction against the elastic force of the spring member 86. Therefore the first rod 81 and the second rod 84 slide in the left direction in proportion to the temperature of the cooling water. The second rod bends the valve member 65 so as to pull the ends of the valve member 65 out from the openings 64, and the degree by which valve member 65 closes the second passage 61 is thereby reduced as shown in FIGS. 3 and 5. Because the ends of the valve member 65 are held by the bridge members 62, the valve member 65 is bent at the center portion thereof like an arch with a pair of fulcrums at each end of the valve member 65. The second passage 61 is thus opened in proportion to the temperature of the cooling water. The viscous fluid introduced into the operating chamber 22 through the first passage 31 then gradually flows into the second torque transmitting portion 57 through the second passage 61 in proportion to the temperature of the cooling water, and the rotational speed of the cooling fan is gradually increased in proportion to the temperature of the cooling water by the operation of the first torque transmitting portion 54 and the second torque transmitting portion 57.

When the volume of the thermowax 78 reaches a maximum and the quantity of an opening of the second passage 61 also becomes a maximum, the cooling fan is rotated with a rotational speed R3 (R3>R2>R1) shown in FIG. 6. Again, the viscous fluid flowing into the first torque transmitting portion 54 collects at the outer periphery of the operating chamber 22 due to centrifugal force and is pumped out to the first storing chamber 23 by the pumping means 38. The viscous fluid flowing into the second torque transmitting portion 57 collects at the outer periphery of the operating chamber 22 due to centrifugal force and is pumped out to the first storing chamber 23 by the helical spline portion 51 and the pumping means 38. Therefore, under this condition the viscous fluid circulates through two circuits, one of which includes the first storing chamber 23, the first passage 31, the first torque transmitting portion 54, the pumping means 38, and back to the first storing chamber 23. The other circuit includes the first storing chamber 23, the first passage 31, the second passage 61, the second torque transmitting portion 57, the helical spline 51, the pumping means 38 and back to the first storing chamber 23. By the way, the diagram showing the rotational speed of the cooling fan in FIG. 6 illustrates a hysteresis between the increase and decrease of the rotational speed.

Figure 7:
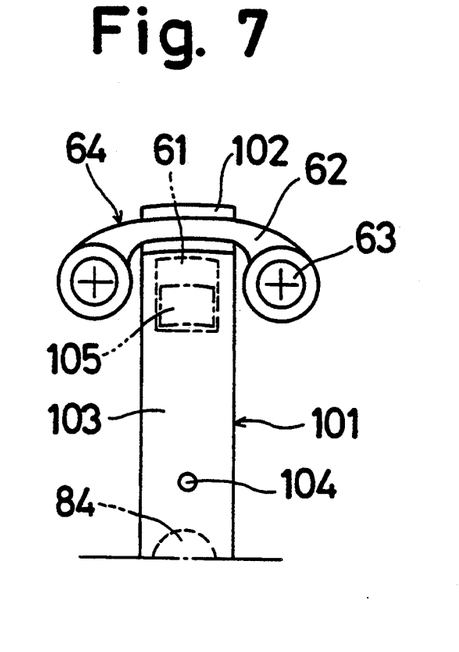
FIG. 7 is a plan view of a valve member of a fan coupling for an engine of a vehicle of a second embodiment when the valve member closes the second passage.
Figure 9:
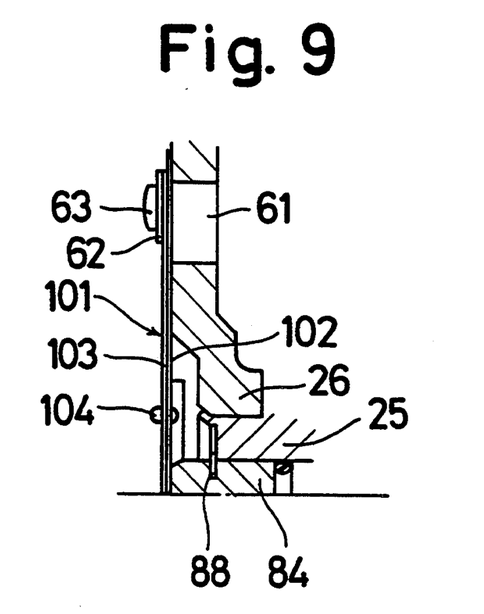
FIG. 9 is a sectional view of a closed condition of a valve member shown in FIG. 7.

The second embodiment of the fan coupling for an engine of a vehicle according to the present invention will be described hereinafter. In FIGS. 7 and 9 a valve member 101 comprises a first plate 102 and a second plate 103 which is shorter than the first plate 102. The first plate 102 is fitted into the openings 64 at each of the ends thereof. The second plate 103 is mounted on the first plate 102 and is connected with the first plate 102 by a pair of rivets 104. However the free ends of the second plate 103 do not engage with the openings 64. The first plate 102 has a pair of openings 105 so that each of the openings 105 overlies one of the second passages 61. The amount of the open area of each of the openings 105 is smaller than that each of the second passages 61. The openings 105 are normally closed by the second plate 103.

Figure 8:
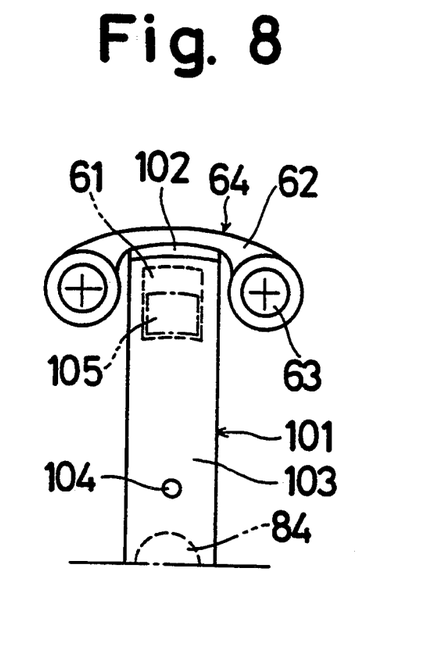
FIG. 8 is a plan view of a valve member of a fan coupling for an engine of a vehicle of the second embodiment when the valve member opens the second passage.
Figure 10:
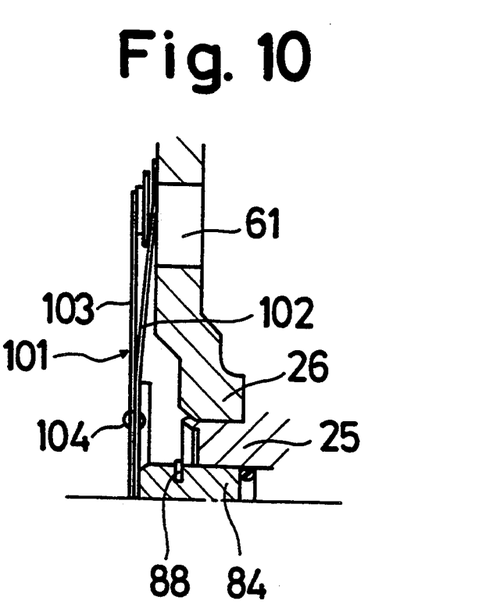
FIG. 10 is a sectional view of an opened condition of a valve member shown in FIG. 8.

When the thermowax 78 expands due to the heat, the second rod 84 presses on the first plate 102 so as to pull each end of the first plate 102 out from the openings 64 as shown in FIG. 8 and 10. Because each end of the first plate 102 is held by one of the bridge members 62, the first plate 102 is resiliently bent at the center portion thereof like an arch with a pair of fulcrums at each end of the first plate 102. On the other hand, because the second plate 103 is not held by the bridge members 62, the second plate 103 is moved according to the movement of the second rod 84 while remaining flat. Therefore the degree by which each free end of second plate 103 closes the openings 105 is reduced in proportion to the stroke of the second rod 84 and the resulting bending of first plate 102, and the effective opening degree of second passage 61 by each of the openings 105 is increased in proportion to the stroke of the second rod 84. Furthermore the amount of the open area of each of the second passages 61 which is not overlaid by the openings 105 is also increased in proportion to the movement of the first plate 102 because the amount of the open area of each of the openings 105 is smaller than that of each of the second passages 61. The other constructions and operations of the second embodiment are same as the first embodiment, and their detailed explanation is omitted.

The fan coupling for an engine of a vehicle according to the present invention can control the rotational speed of the housing in proportion to the temperature of the cooling water. Therefore the noise due to the rotational of the cooling fan and the losses in engine output can be reduced because the housing does not need to be unnecessarily enlarged.

Furthermore the fan coupling for an engine of a vehicle according to the present invention is usable in any kind of engine because the amount of the opening area of the second passage is variable by altering the material of the valve member, the location of the bridge member and the characteristic of the detecting means of the temperature of the cooling water.

While the invention has been particularly shown and described with reference to preferred embodiment thereof, it will be understood by those skilled in the art that the foregoing and other changes in form and details can be made therein without departing from the spirit and scope of the invention.

What is claimed as new and desired to be secured by Letters Patent of the United States is:

1. A fan coupling for an engine of a vehicle, comprising:
   a housing for mounting a cooling fan which includes a storing chamber;
   a rotor disposed in the housing and including a torque transmitting portion at one side surface thereof;
   a passage communicating the storing chamber with the torque transmitting portion;
   a restraint member fixed on the rotor;
   a valve member inserted between the rotor and the restraint member so as to be held at at least one end thereof by the restraint member; and
   forcing means for forcing the valve member to open the passage in proportion to the temperature of the cooling water.

2. A fan coupling for an engine of a vehicle as recited in claim 1, wherein the forcing means includes a thermowax.

3. A fan coupling for an engine of a vehicle as recited in claim 1, wherein the forcing means includes a shape memory effect alloy.

4. A fan coupling for an engine of a vehicle as recited in claim 1, wherein the forcing means includes a shape memory effect synthetic material.

5. A fan coupling for an engine of a vehicle, comprising:
   a housing for mounting a cooling fan which includes a storing chamber;
   a rotor disposed in the housing and including a torque transmitting portion at one side surface thereof;
   a passage communicating the storing chamber with the torque transmitting portion; and
   a control mechanism for opening and closing the passage in proportion to the temperature of the cooling water for the engine;
   the control mechanism including a valve which normally closes the passage and a mechanism for forcing the valve member to open the passage in proportion to the temperature of the cooling water, said valve comprising a plate-like valve member to cover and close said passage; and
   said plate-like valve member including a first plate positioned against the rotor and having an opening which overlies the passage, and a second plate laid on the first plate wherein said second plate is shorter than the first plate.

6. A fan coupling for an engine of a vehicle as recited in claim 5, wherein the forcing mechanism includes a thermowax mechanism.

7. A fan coupling for an engine of a vehicle as recited in claim 5, wherein the forcing mechanism includes a shape memory effect alloy.

8. A fan coupling for an engine of a vehicle as recited in claim 5, wherein the forcing mechanism includes a shape memory effect synthetic material.

9. A fan coupling for an engine of a vehicle, comprising:

a housing for mounting a cooling fan which includes a storing chamber;

a rotor disposed in the housing and including a torque transmitting portion at one side surface thereof;

a passage communicating the storing chamber with the torque transmitting portion; and a control mechanism for opening and closing the passage in proportion to the temperature of the cooling water for the engine;

the control mechanism including a valve which normally closes the passage and a mechanism for forcing the valve member to open the passage in proportion to the temperature of a cooling water, said valve comprising a plate-like valve member to cover and close said passage; and wherein said valve member comprises an elongate resilient plate and wherein said forcing mechanism presses on a central portion of said valve member to deform said valve member so as to open said passage in proportion to the temperature of cooling water.

10. A fan coupling for an engine of a vehicle, comprising:

a housing for mounting a cooling fan which includes a storing chamber;

a rotor disposed in the housing and including a torque transmitting portion at one side surface thereof;

a passage communicating the storing chamber with the torque transmitting portion;

a control mechanism for opening and closing the passage in proportion to the temperature of the cooling water of the engine wherein the control mechanism includes a valve which normally closes the passage and a forcing mechanism for forcing the valve to open in proportion to the temperature of the cooling water;

a plurality of restraint members fixed to said rotor;

a first elongate resilient plate, said first plate having an opening overlying said passage; and a second elongate resilient plate lying on said first plate and covering said opening to thereby close said passage, said second plate being shorter than said first plate such that said second plate is not held by said restraint members, wherein said forcing mechanism presses on a central portion of said first plate to deform said first plate so as to open said passage, and wherein said deformation of said first plate causes separation of said first and second plates such that said opening is uncovered.

11. A fan coupling for an engine of a vehicle, comprising:

a housing for mounting a cooling fan which includes a storing chamber;

a rotor disposed in the housing and including a torque transmitting portion at one side surface thereof;

a passage communicating the storing chamber with the torque transmitting portion;

a restraint member fixed on the rotor;

a valve member inserted between the rotor and the restraint member so as to be held at at least one end thereof by the restraint member; and a forcing mechanism for forcing the valve member to open the passage in proportion to the temperature of the cooling water.

12. A fan coupling for an engine of a vehicle as recited in claim 11, wherein the forcing mechanism includes a thermowax member.

13. A fan coupling for an engine of a vehicle as recited in claim 11, wherein the forcing mechanism includes a shape memory effect alloy.

14. A fan coupling for an engine of a vehicle as recited in claim 11, wherein the forcing mechanism includes a shape memory effect synthetic material.

15. A fan coupling for an engine of a vehicle, comprising:

a housing for mounting a cooling fan which includes a storing chamber;

a rotor disposed in the housing and including a torque transmitting portion at one side surface thereof;

a passage communicating the storing chamber with the torque transmitting portion; and control means for opening and closing the passage in proportion to the temperature of the cooling water for the engine, the control means including a valve which normally closes the passage and means for forcing the valve member to open the passage in proportion to the temperature of the cooling water, said valve comprising a plate-like valve member to cover and close said passage; and said plate-like valve member including a first plate positioned against the rotor and having an opening which overlies the passage, and a second plate laid on the first plate wherein said second plate is shorter than the first plate.

16. A fan coupling for an engine of a vehicle as recited in claim 17, wherein the forcing means includes a thermowax member.

17. A fan coupling for an engine of a vehicle as recited in claim 15, wherein the forcing means includes a shape memory effect alloy.

18. A fan coupling for an engine of a vehicle as recited in claim 15, wherein the forcing means includes a shape memory effect synthetic material.

19. A fan coupling for an engine of a vehicle, comprising:

a housing for mounting a cooling fan which includes a storing chamber;

a rotor disposed in the housing and including a torque transmitting portion at one side surface thereof;

a passage communicating the storing chamber with the torque transmitting portion; and control means for opening and closing the passage in proportion to the temperature of the cooling water for the engine;

the control means including a valve which normally closes the passage and means for forcing the valve member to open the passage in proportion to the temperature of a cooling water, said valve comprising a plate-like valve member to cover and close said passage;

wherein said valve member comprises an elongate resilient plate and wherein said forcing means presses on a central portion of said valve member to deform said valve member so as to open said passage in proportion to the temperature of the cooling water.

20. A fan coupling for an engine of a vehicle, comprising:

a housing for mounting a cooling fan which includes a storing chamber;

a rotor disposed in the housing and including a torque transmitting portion at one side surface thereof;

a passage communicating the storing chamber with the torque transmitting portion;

control means for opening and closing the passage in proportion to the temperature of the cooling water of the engine wherein the control means includes a valve which normally closes the passage and means for forcing the valve to open in proportion to the temperature of the cooling water;

a plurality of restraint members fixed to said rotor;

a first elongate resilient plate, said first plate having an opening overlying said passage; and a second elongate resilient plate lying on said first plate and covering said opening to thereby close said passage, said second plate being shorter than said first plate such that said second plate is not held by said restraint members, wherein said forcing means presses on a central portion of said first plate to deform said first plate so as to open said passage, and wherein said deformation of said first plate causes separation of said first and second plates such that said opening is uncovered.

* * * * *